(12) United States Patent
Mayr et al.

(10) Patent No.: US 9,052,723 B2
(45) Date of Patent: Jun. 9, 2015

(54) PRESSURE CONTROL VALVE APPARATUS HAVING A FLOW-GUIDING DEVICE

(75) Inventors: Karlheinz Mayr, Bregenz (AT); Markus Moosmann, Gruenkraut (DE); Frank Hamma, Oberteuringen (DE); Hubert Remmlinger, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 14/131,968

(22) PCT Filed: Jun. 14, 2012

(86) PCT No.: PCT/EP2012/061322
§ 371 (c)(1),
(2), (4) Date: Jan. 10, 2014

(87) PCT Pub. No.: WO2013/010731
PCT Pub. Date: Jan. 24, 2013

(65) Prior Publication Data
US 2014/0150908 A1    Jun. 5, 2014

(30) Foreign Application Priority Data
Jul. 19, 2011  (DE) .......... 10 2011 079 366

(51) Int. Cl.
*F16K 31/06* (2006.01)
*G05D 16/20* (2006.01)
(Continued)

(52) U.S. Cl.
CPC ........ *G05D 16/2033* (2013.01); *F16K 31/0631* (2013.01); *F16K 31/0637* (2013.01); *F16K 47/12* (2013.01); *G05D 16/2013* (2013.01); *F16K 27/029* (2013.01); *F16K 31/0658* (2013.01)

(58) Field of Classification Search
CPC ............ F16K 31/0631; F16K 31/0637; F16K 31/0658; F16K 47/12; G05D 16/2033
USPC ........ 137/596.17; 251/118, 119, 126, 129.14, 251/129.15; 303/119.2
See application file for complete search history.

(56) References Cited

U.S. PATENT DOCUMENTS

| | | | |
|---|---|---|---|
| 1,759,081 A | 5/1930 | Anderson | |
| 4,921,215 A | 5/1990 | Fujiwara | |

(Continued)

FOREIGN PATENT DOCUMENTS

| | | |
|---|---|---|
| DE | 36 36 348 A1 | 5/1987 |
| DE | 39 02 466 A1 | 8/1989 |

(Continued)

OTHER PUBLICATIONS

German Search Report Corresponding to 10 2011 079 366.6 mailed Jun. 20, 2012.

(Continued)

*Primary Examiner* — Matthew W Jellett
(74) *Attorney, Agent, or Firm* — Davis & Bujold, P.L.L.C.; Michael J. Bujold

(57) ABSTRACT

A pressure control valve unit (10) for a fluid with at least one inlet area (P) and first and second outlet areas (A, T) which can be connected for fluid flow with one another by two mutually coupled seat valves (23, 24). An incoming fluid flow, from the inlet area (P) to the first and second outlet areas (A, T), can be adjusted by way of the first seat valve (23), and a fluid outflow, between the first and second outlet areas (A,T), can be adjusted by way of the second seat valve (24). In this case, a flow-guiding device (26) is arranged, upstream from the first seat valve (23) in the inlet area (P), and imposes a specific flow characteristic upon the inflowing fluid in the area of the first seat valve (23).

15 Claims, 4 Drawing Sheets

(51) Int. Cl.
*F16K 47/12* (2006.01)
*F16K 27/02* (2006.01)

(56) References Cited

U.S. PATENT DOCUMENTS

| | | | |
|---|---|---|---|
| 4,936,342 A | 6/1990 | Kojima et al. | |
| 5,251,444 A | 10/1993 | Ochiai et al. | |
| 6,719,006 B2 | 4/2004 | Fleischer et al. | |
| 6,904,934 B2 | 6/2005 | Runge et al. | |
| 7,516,756 B2 | 4/2009 | Mayr et al. | |
| 7,905,249 B2 | 3/2011 | Mayr et al. | |
| 7,984,729 B2 | 7/2011 | Mayr | |
| 8,701,707 B2 | 4/2014 | Moosmann et al. | |
| 2002/0053362 A1 | 5/2002 | Frei et al. | |
| 2003/0037825 A1 | 2/2003 | Runge et al. | |
| 2003/0136449 A1 | 7/2003 | Boddy | |
| 2004/0089353 A1 | 5/2004 | Soga et al. | |
| 2005/0034769 A1 | 2/2005 | Moreno et al. | |
| 2005/0067028 A1* | 3/2005 | Ryuen et al. | 137/596.17 |
| 2005/0284524 A1 | 12/2005 | Uryu et al. | |
| 2006/0272714 A1 | 12/2006 | Carrillo et al. | |
| 2010/0276022 A1 | 11/2010 | Moosmann et al. | |
| 2012/0167991 A1 | 7/2012 | Feilner | |
| 2012/0298903 A1* | 11/2012 | Scherer et al. | 251/333 |
| 2014/0150908 A1 | 6/2014 | Mayr et al. | |

FOREIGN PATENT DOCUMENTS

| | | | |
|---|---|---|---|
| DE | 198 27 281 C1 | 1/2000 | |
| DE | 100 34 959 A1 | 2/2002 | |
| DE | 10 2005 021 902 A1 | 11/2006 | |
| DE | 10 2008 000 106 A1 | 7/2009 | |
| WO | 92/01163 A1 | 1/1992 | |
| WO | 2005/026858 A1 | 3/2005 | |
| WO | 2009/092488 A1 | 7/2009 | |
| WO | WO2009/092488 | * 7/2009 | F16K 31/06 |

OTHER PUBLICATIONS

International Search Report Corresponding to PCT/EP2012/061322 mailed Sep. 26, 2012.
Written Opinion Corresponding to PCT/EP2012/061322 mailed Sep. 26, 2012.
International Preliminary Report on Patentability Corresponding to PCT/EP2012/061322 mailed Nov. 22, 2013.
German Search Report Corresponding to DE 10 2011 087 264.7 mailed Aug. 10, 2012.

* cited by examiner

PRESSURE CONTROL VALVE APPARATUS HAVING A FLOW-GUIDING DEVICE

This application is a National Stage completion of PCT/EP2012/061322 filed Jun. 4, 2012, which claims priority from German patent application serial no. 10 2011 079 366.6 filed Jul. 19, 2011.

FIELD OF THE INVENTION

The invention relates to a pressure control valve unit for a fluid.

BACKGROUND OF THE INVENTION

In multi-step motor vehicle automatic transmissions known in practice, shifting elements in the form of wet clutches or brakes are used for engaging various gear ratio steps between a transmission input shaft and a transmission output shaft of the automatic transmission. For this purpose, depending on the gear ratio step desired, the shifting elements are opened or closed. In most cases the pressure force required for that is applied, for each shifting element, by a hydraulically actuated clutch piston which is supplied with hydraulic fluid by way of shifting element valves, also known as pressure reducing valves. These pressure reducing valves are either themselves designed as proportional pressure control valves, or are actuated by hydraulic pilot control wherein the hydraulic pressure required for the pilot control is again set by a proportional pressure control valve. In such a proportional pressure control valve, depending on an energizing current a magnetic force is produced, as a function of which a certain predictable working pressure is set at the valve. This pressure can be tapped from an outlet area of the valve and is determined by the ratio between the magnetic force (the action force) and a return force of the valve directed in opposition to the magnetic force (the reaction force).

The proportional pressure control valves commonly encountered today, for example that described in WO 2005/026858 A1, comprise two seat valves coupled in a hydraulic semi-bridge circuit, i.e. they have one inlet area and two outlet areas, such that in terms of flow a first seat valve is arranged between the inlet area and the first outlet area and a second seat valve is arranged between the inlet area and the second outlet area. In this case the seat valves are designed, and their closing elements are coupled to one another, in such manner that in their end positions the closing elements close or open the seat valves alternately.

To reduce the flow resistance and increase the ability of a transmission shifting element controlled by the pressure control valve to be dynamically regulated, in WO 2005/026858 A1 a flow-guiding device is proposed, to be specific a stream deflector between the first and second outlet areas, which deflects a fluid flow from the first seat valve to the second seat valve by less than 30°.

From WO 20091092488 A1 it is also known to provide such a flow-guiding device with a plurality of channel areas in such manner that a swirling motion is imparted to the fluid flowing in the direction of the second seat valve, which improves the valve dynamics and reduces the valve leakage.

With these pressure control valves known from the prior art, pressure fluctuations can occur on the inlet or outlet side which, for example, result from pump pressure fluctuations or slip-stick effects in the shifting elements of a vehicle transmission, and which act almost without impediment on the closing elements of the seat valves, which makes it more difficult to set a measurable working pressure at the valve.

SUMMARY OF THE INVENTION

Accordingly, the purpose of the present invention is to provide a pressure control valve unit which is not sensitive to pressure fluctuations.

This objective is achieved by a pressure control valve unit having the characteristics described below.

A pressure control valve unit for a fluid is proposed, having at least one inlet area and with a first and second outlet area, which can be fluidically connected to one another by two mutually coupled seat valves, in particular in order to establish a fluid pressure level in a first outlet area, wherein by way of the first seat valve a fluid inflow from the inlet area to the first and second outlet areas can be produced and by way of the second seat valve a fluid outflow between the first and second outlet areas can be produced. In this case, upstream from the first seat valve in the inlet area a flow-guiding device is arranged, which imposes a specified flow characteristic on the inflowing fluid in the area of the first seat valve.

It has been found that a pressure control valve unit of this type, made with a flow-guiding device in the inlet area upstream from the first seat valve, is less sensitive than the pressure control valve units known from the prior art in relation to pressure fluctuations from the inlet area, i.e. from the inlet side, and from the first outlet area, i.e. from a working pressure connection.

Furthermore, in the valves known from the prior art the flow characteristic of the fluid flowing into the first seat valve is influenced unpredictably by a number of parameters, in particular the pressure and flow rate of the fluid and the design of the fluid system upstream from the pressure control valve unit (diameter and layout of the lines, etc.), so that the flow characteristic of the fluid flowing into the valve is subject to marked fluctuations. Because of this it can happen that structurally identical pressure control valve units operated under the same conditions (pressure level, fluid temperature, etc.), but which are fitted into different fluid systems, have different control characteristics. For example a pressure control valve unit in a shifting device of an automatic transmission can have a control characteristic different from a structurally identical pressure control valve unit in a shifting device of an automated variable-speed transmission, and this is due to the different designs of the respective fluid systems upstream from the pressure control valve unit in each case.

By virtue of the measures proposed, a specific fluid characteristic is now imposed on the fluid flow, in particular a flow direction and/or a flow rate (flow field). This means that the previously unpredictable characteristic of the fluid flowing into the pressure control valve unit is deflected by the proposed flow-guiding device into known, stable paths. In particular pressure fluctuations are thereby so smoothed or controlled that they have no, or only a marginal effect on the pressure control valve unit.

Due to the propagation of the flow stabilized by the flow-guiding device also downstream from the first seat valve, excitations or disturbances, in particular pressure fluctuations which spread into the pressure control valve unit from its first outlet area, i.e. from the working pressure connection, are smoothed so that in an advantageous manner these are not propagated upstream from the pressure control valve unit, or only so to a limited extent.

The flow-guiding device preferably consists of one or more guide vanes, flow-guiding channels or other flow-guiding elements in the inlet area. The flow-guiding device is in particular designed such that the fluid flowing in from the inlet area essentially flows around the closing element of the first seat valve. Pressure fluctuations in the fluid flow then no longer impinge directly perpendicularly on the closing element, so that the latter is less markedly affected and the control quality of the valve unit is improved.

Since a flow directed onto the closing element is inevitable, it is proposed to design the flow-guiding device such that the fluid flowing in from the inlet area is guided essentially in the form of a thin-walled stream along the closing element. This can be achieved if the flow-guiding device guides the fluid onto the closing element essentially tangentially to it. Thus, the fluid flow no longer impinges perpendicularly against the closing element but, in a flow-assisting manner, is instead guided along the closing element in the form of a thin film. Since the fluid flow encounters the closing element essentially tangentially, sliding along it, substantially smaller pressure fluctuation fractions are transmitted to the closing element so that the control quality of the pressure control valve unit is improved.

In a particularly preferred further development of the pressure control valve unit, it is provided that the flow-guiding device is designed to impart a spiral, twisting motion to the inflowing fluid in the area of the first seat valve, in particular a spiral flow around a longitudinal or movement axis of the closing element of the first seat valve. This means that the flow characteristic determined by the flow-guiding device corresponds to a spiral flow. This results in particularly effective damping of excitations or disturbances that propagate from the inlet area or from the first outlet area into the pressure control valve unit. Such a spiral flow is particularly stable and absorbs excitations or disturbances with a damping effect. In this context a longitudinal or movement axis of the closing element is understood to mean an axis along which the closing element of the seat valve concerned can move to open and close the seat valve.

Moreover, the controlled guiding of the flow toward the first seat valve by means of the flow-guiding device, particularly in the form of a spiral flow, also reduces the flow resistance of the first seat valve. This is essentially attributable to a reduction of the turbulent flow fraction in the inflowing fluid, which results in reduced excitation of fluctuations.

In a further preferred embodiment of the pressure control valve unit a second flow-guiding device is provided, which is positioned fluidically upstream from the second seat valve between the first and second outlet areas. This is designed such that in the area of the second seat valve a spiral, twisting motion is imparted to the fluid flowing to the second outlet area. In particular it is proposed, by means of the second flow-guiding device, to impart to the fluid flowing through the second seat valve a spiral, twisting flow around a longitudinal or movement axis of the closing element of the second seat valve, whereby the valve dynamic can be improved and a leakage volume flow of the pressure control valve unit can be reduced. As has been shown, these effects are reinforced if the two flow-guiding devices are designed such that the twist directions of the fluid flows respectively through the first and through the second seat valve are the same. In that the first flow-guiding device is designed to produce a spiral flow, the second one can be designed analogously thereto.

In a further development of the pressure control valve unit, the first flow-guiding device has at least one and preferably more than one flow-guiding channel, which open at least approximately tangentially to a seat valve aperture of the first seat valve in the inlet area. In other words, in order to impart the flow characteristic the fluid-guiding channel or channels open laterally offset relative to the seat valve aperture in the inlet area. In this way the fluid flow is guided smoothly, essentially tangentially to the closing element of the first seat valve. This assists the imposition of a fluid flow in the form of a thin film along the closing element through the first seat valve. Preferably, in the downstream direction toward the seat valve aperture the flow-guiding channels converge in a funnel shape, in particular in such manner that as the fluid approaches the seat valve aperture it accelerates (conservation of angular momentum). If only one flow-guiding channel is provided, this runs in the downstream direction toward the seat valve aperture in a funnel shape. Preferably, relative to a longitudinal or movement axis of the closing element of the first seat valve, the funnel shape has an opening angle of 40° to 80°, particularly preferably 60°±10°. The funnel shape can also be rounded, in particular convex or concave. The opening angle then corresponds to an average gradient angle of the funnel shape relative to the longitudinal or movement axis of the closing element. The flow-guiding channel or channels can also be made in the shape of a helix. Preferably, the helix then runs concentrically or eccentrically around the longitudinal or movement axis of the closing element. Instead of or in addition to the helix shape, the flow-guiding channel or channels can extend in a spiral down to the seat valve aperture, i.e. in the downstream direction they run down toward the seat valve aperture with a decreasing radius.

In a further development of the pressure control valve unit, the width or diameter of the flow-guiding channel or channels, i.e. the flow cross-section thereof, decreases as a longitudinal or movement axis of the closing element is approached. In particular, a fluid inlet opening or cross-section through which fluid enters the flow-guiding channel concerned has a larger passage area than a fluid outlet or cross-section through which fluid flows out of the flow-guiding channel concerned and which is closer to the longitudinal or movement axis than the inlet opening or cross-section. This increases the speed of the fluid in the flow-guiding channels as the longitudinal or movement axis is progressively approached, i.e. in the direction toward the valve aperture of the first seat valve, whereby a more rapid and more stable fluid flow is achieved downstream from the flow-guiding channels in the area of and downstream from the first seat valve.

In an embodiment of the pressure control valve unit a cross-section of the flow-guiding channels in a plane perpendicular to a longitudinal or movement axis of the closing element of the first seat valve is propeller-shaped or at least essentially propeller-shaped. In other words the flow-guiding channels in each case form propeller-blade shaped recesses or channels such that at the root of each propeller blade there is at least one opening for fluid to emerge in the direction of the first seat valve. The opening can extend over the full length of each flow-guiding channel, or it can be only in the area of the valve aperture of the first seat valve. To produce a spiral flow, the outlet opening of each flow-guiding channel is preferably laterally offset relative to the longitudinal or movement axis, i.e. it is directed tangentially past the longitudinal or movement axis. In particular therefore, the outlet opening is designed such that the fluid emerges out of the flow-guiding channels tangentially or at least approximately tangentially to the valve aperture of the first seat valve. The propeller shape of the flow-guiding channels preferably corresponds to or resembles the shape of a marine or aircraft propeller, for example a boat, ship or airscrew, but without being limited to that.

The flow-guiding device can both be an integral part of a housing of the pressure control valve unit, for example if the flow-guiding device is injection-molded, milled or drilled into the housing by appropriate production means, or the flow-guiding device can be a separate component fixed firmly into the pressure control valve unit, i.e. for example pressed, bonded, injected or screwed into it during the manufacturing process. For that purpose the flow-guiding device is for example made as a sleeve which is fixed into a housing of the pressure control valve unit during the assembly of the pressure control valve unit. Indeed, the first seat valve can also form a conjoint assembly with the flow-guiding device.

In a further embodiment a control edge of the first seat valve of the pressure control valve unit is formed essentially with an acute angle or a right-angle. Particularly when the flow-guiding device is designed to produce a spiral flow, this ensures a low-loss passage through the valve aperture of the first seat valve. In a flow-assisting manner, for this purpose the control edge has no, or only a very small chamfer (chamfer radius smaller than 0.1 mm), i.e. the control edge is made as "sharp" as possible. Preferably, downstream from the valve control edge or a control surface of the first seat valve the valve aperture widens out continuously. In this way, downstream from the first seat valve the valve aperture acts as a diffuser, which also reduces or at least assists in the reduction of the inlet-side pressure fluctuations. Furthermore, by virtue of the diffuser action an under-pressure, i.e. a pressure drop is produced in the immediate proximity of the closing element of the first seat valve, which assists the opening or closing of the first seat valve and so improves its valve dynamic.

In a particularly preferred variant of the pressure control valve unit it comprises a proportional electromagnet, i.e. an electromagnet with an armature whose position can be varied as a function of an electric current supplied to the electromagnet. The armature serves to move the two mutually coupled closing elements of the first and second seat valves. In this way, the pressure that is applied at and can be tapped from the first outlet area, can be precisely adjusted or regulated by means of the electric current supplied. The proposed pressure control valve unit is, moreover, preferably designed as a hydraulic pressure control valve unit, in particular as a hydraulic pressure control valve unit of a vehicle transmission. A field of use for the pressure control valve unit is in particular in a hydraulically designed gearshift device for engaging various gear ratios of a multi-stage automatic transmission or an automated variable-speed transmission in a vehicle, but without being limited thereto. For example applications outside the automotive sector are also conceivable, such as in stationary hydraulic equipment.

BRIEF DESCRIPTION OF THE DRAWINGS

Below, the invention is explained in more detail with reference to examples and drawings, from which further advantageous design features and characteristics of the invention emerge. The drawings show, in each case represented schematically.

DETAILED DESCRIPTION OF THE PREFERRED EMBODIMENTS

In FIGS. 1 to 4 identical or at least functionally equivalent components are in each case provided with the same indexes.

Figure 1:
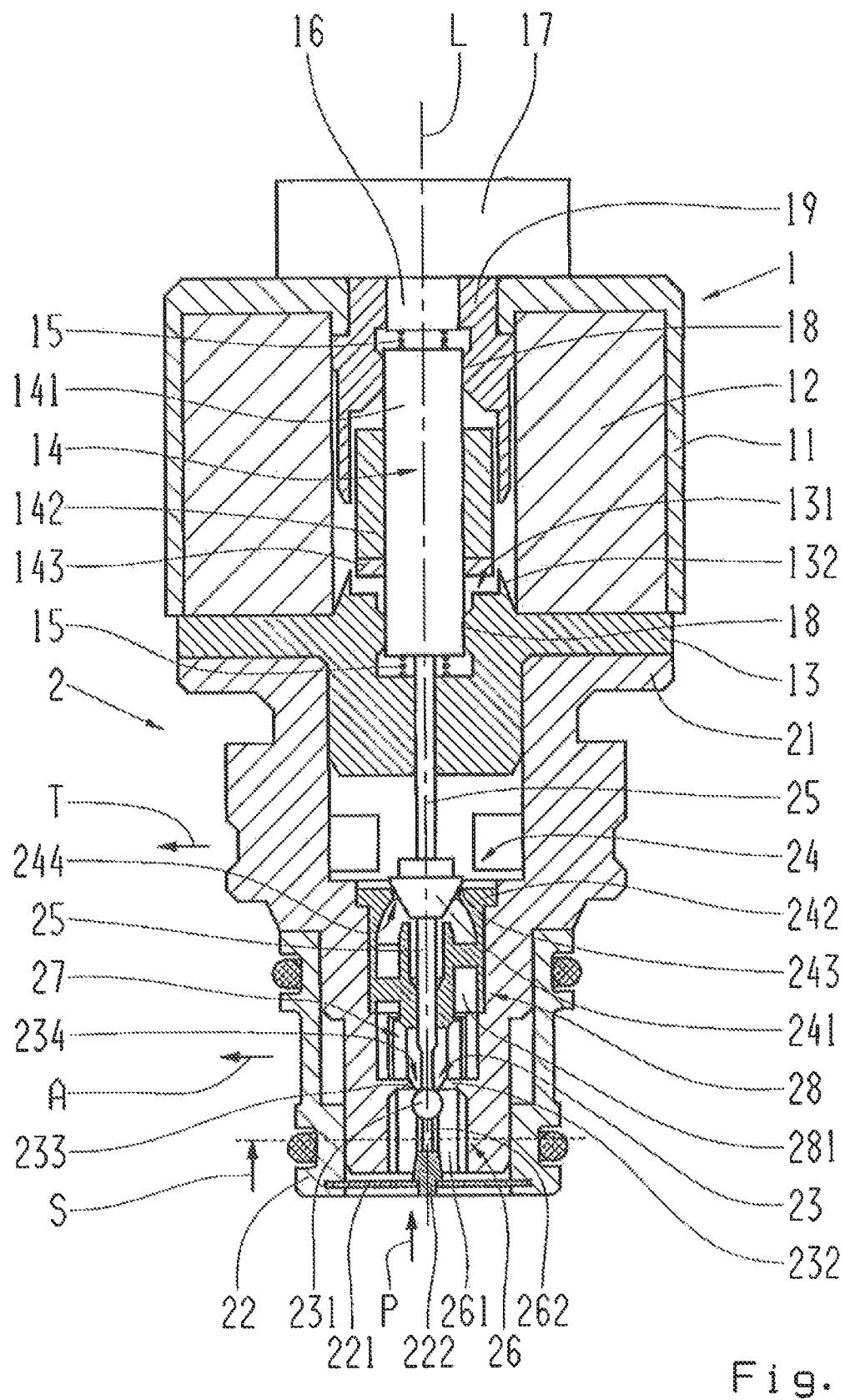
FIG. 1: A two-dimensional section through a proposed pressure control valve unit, along a longitudinal axis thereof.

FIG. 1 shows a longitudinal section through a pressure control valve unit designed as a proportional pressure control valve. The pressure control valve unit consists essentially of an electromagnet portion 1, i.e. an actuator, and a valve portion 2, whose respective housings 11, 21 are connected fixed to one another. The electromagnet portion 1 comprises an electromagnet consisting at least of an electric magnetic solenoid 12 arranged in the housing 11, a magnet yoke 13 fixed in position relative to the solenoid 12, and an armature 14 that can move relative to the magnetic solenoid 12 and the magnet yoke 13. In the case illustrated, the armature 14 is made in three parts and comprises an armature rod 141, an armature body 142 and an anti-sticking disk 143 made of a non-magnetic material such as aluminum. However, other suitable armature designs or types can be used just as well. The anti-sticking disk 143 prevents the armature 14 from sticking magnetically when the magnetic solenoid 12 is changed from an energized to a de-energized condition. To enable pressure equalization within the electromagnet portion 1 when the armature 14 moves, the armature rod 141 is preferably provided with pressure equalization openings, i.e. holes.

The position of the armature 14 when the solenoid 12 is not energized, is determined by means of two elastic spring elements 15, here for example spiral compression springs, inside the electromagnet portion. A pre-stress of the spring element 15 facing away from the valve portion 2 can be adjusted by a pre-stressing element 16. As in the case illustrated this can in particular be pressed in, and then the pre-stress is adjusted as a function of the pressing-in depth, or it can be screwed in, and then the pre-stress is adjusted as a function of the screw-in depth. Joined to the housing 11 of the electromagnet portion 1 is an electric contacting device 17 which is connected electrically to the magnetic solenoid 12 and by way of which the solenoid 12 can be energized by an electronic system (not shown) external to the pressure control valve unit. In an alternative version of the pressure control valve unit the electronic system, or at least part of it, is integrated in the electromagnet portion 1.

On a face directed toward the armature 14, the magnet yoke 13 has a recess 131 with a magnet control edge 132. By virtue of the design of the magnet control edge 132, here in the form of a cone, how large the magnetic force acting on the armature 14 due to the electric current supplied at the time and in the position of the armature 14 at the time, can be adjusted precisely. Preferably, however, the magnet control edge 132 is designed so that a magnetic force applied is proportional to the size of a current supplied to the solenoid 12, largely independently of exactly where the armature 14 is positioned relative to the magnet yoke 13 (proportional electromagnet). Opposite the magnet yoke 13 the electromagnet portion 1 comprises a fixed pole tube 19 which serves to improve the orientation of the magnetic field of the solenoid 12. In this case the armature 14 is, for example, fitted with a first slide bearing 18 in the pole tube 19 and with a second slide bearing 18 in the magnet yoke 13, so that it can move axially in the direction of a longitudinal axis L of the pressure control valve unit. However, other bearing designs can be used just as well.

Joined onto the electromagnet portion 1, the pressure control valve unit comprises the valve portion 2. This has a filter strainer 22 pushed onto the housing 21, with a first, inlet-side filter 221 on the end of the pressure control valve unit and a second, outlet-side filter arranged laterally on the pressure control valve unit which, however, is not shown. The first filter 221 serves to filter the fluid flowing into the pressure control valve unit, while the second filter serves to filter the fluid flowing out of a working connection of the pressure control valve unit. Arranged on the filter strainer 22 are O-ring seals which separate an inlet area P, a first outlet area A and a second outlet area T of the pressure control valve unit from one another in a fluid-tight manner. The inlet area P, also called the pressure supply connection, is arranged in an axial end face of the pressure control valve unit, whereas the first outlet area A, also called the working pressure connection, and the second outlet area T, also called the tank connection, are arranged radially relative to the longitudinal axis L. However, by a corresponding, appropriate layout of channels within the valve portion 2 the arrangement of the inlet area P and the first and second outlet areas A, T can also be interchanged. A preferred flow direction of the fluid out of and into the inlet area A and the first and second outlet areas A, T is indicated by arrows.

Inside the housing 21 the valve portion 2 has a first seat valve 23 and a second seat valve 24, by which the inlet area P, the first outlet area A and the second outlet area T can be flow-connected with one another. In this way a pressure level in the first outlet area A can be set in a controlled manner. The first seat valve 23 has a closing element 231 that can move along a longitudinal axis of the first seat valve 23, in the case illustrated in the form of a ball, and the second seat valve 24 also has a closing element 241 that can move along a longitudinal axis of the second seat valve 24, in the case illustrated in the form of a cone. In this case the longitudinal or movement axes of the seat valves 23, 24 coincide with the longitudinal axis L of the pressure control valve unit. However, by using suitable deflecting means the longitudinal or movement axes of the seat valves 23, 24 can also be different, for example parallel or skewed relative to one another. The counterpart to the closing element 231 consists of a valve orifice plate 232 fixed in position relative to the closing element 231. This has a control edge 233 (valve seat) against which the closing element 231 rests in the closed condition illustrated, whereby the first seat valve 23, to be specific a valve aperture 234 of the first seat valve 23, is closed in as fluid-tight a manner as possible. A first effective valve aperture area formed between the closing element 231 and the control edge 233 when the first seat valve 23 is opened determines the quantity of fluid flowing through the first seat valve 23 and the pressure drop at the first seat valve 23, by which the pressure existing at the first outlet area A and which can be tapped therefrom is influenced. The counterpart to the closing element 241 of the second seat valve 24 also consists of a valve orifice plate 242, but this has a conical control surface 243 (valve seat) instead of a control edge. When the closing element 241 rests against the control surface 243 the second seat valve 24 is closed, whereby the second seat valve 24, to be specific a valve aperture 244 of the second seat valve 24, is closed in as fluid-tight a manner as possible. A second effective valve aperture area formed between the closing element 241 and the control surface 243 when the second seat valve 24 is opened determines the quantity of fluid flowing through the second seat valve 24, whereby the pressure existing at the first outlet area A and which can be tapped therefrom is also influenced. Since the fluid flowing through the second seat valve 24 is as a rule discharged unused into a fluid reservoir, this quantity of fluid flowing through the second seat valve 24 is often also referred to as leakage. In the configuration of the pressure control valve unit illustrated, the closing element 231 of the first seat valve 23 is located upstream from the valve aperture 234 and the closing element 241 of the second seat valve 24 downstream from the valve aperture 244.

To a person with knowledge of the field it is clear that the seat valves, to be specific their closing elements 231, 241 and the corresponding valve orifice plates 232, 242 can also be made in some other suitable way. For example, the second seat valve 24 can be a ball valve with a spherical closing element analogous to that of the first seat valve 23 shown. Likewise, the first and/or the second seat valve 23, 24 can be made with a flat valve seat or a conical valve seat (analogously to the second seat valve 24 illustrated). In the case shown, the first seat valve 23 has a control edge 233 against which the closing element 231 rests in the closed condition, i.e. there is an essentially linear contact between the closing element 231 and the valve orifice plate 232, whereas the second seat valve 24 has a control surface 243 against which the closing element 241 rests in the closed condition, i.e. there is an essentially areal contact between the closing element 241 and the valve orifice plate 242. It is clear, however, that the seat valves 23, 24 can also be designed such that both, or either of the two seat valves 23, 24 have an areal or linear contact between the closing elements 231, 241 and the valve orifice plates 232, 242. To produce an areal contact the valve orifice plate has a control surface that matches the surface shape of the closing element, and to obtain a linear contact the valve orifice plate has a control edge that matches the surface shape of the closing element.

The closing elements 231, 241 of the seat valves 23, 24 are actuated by a tappet rod 25 that can move along the longitudinal axis L, to which at least the closing element 241 of the second seat valve 24 is attached. That connection can be formed either fixed in position (as illustrated), or flexibly by means of an interposed elastic element, for example a compression spring arranged between the closing element 241 and the tappet rod 25. The closing element 231 can either also be thus connected to the tappet rod 25 or completely separate from the rod 25 and in that case, to open the first seat valve 23, the tappet rod 25 then just pushes the closing element 231 clear of the valve orifice plate 232 and thereby exposes the valve aperture 234. If the closing element 231 is detached from the tappet rod 25 the seat valve 23 is closed exclusively by the pressure of the fluid flowing in from the inlet area P. By means of the tappet rod 25 the closing elements 231, 241 are coupled with one another in such manner that the seat valves 23, 24 can only be operated alternately. This means on the one hand that if the first seat valve 23 is open the second seat valve 24 is closed, and on the other hand that if the first seat valve 23 is closed the second seat valve 24 can be opened. Thus, the arrangement and coupling of the seat valves 23, 24 corresponds to a hydraulic semi-bridge circuit.

The tappet rod 25 passes through the magnet yoke 13 and rests against a face of the armature 14 facing toward the valve 2. Alternatively it can also be attached fixed to the armature 14 or connected thereto via an elastic element such as a compression spring etc. The opening via which the tappet rod 25 passes through the magnet yoke 13 is preferably designed to be fluid-tight and to act as a guide for the tappet rod 25. Thus, axial movement of the armature 14 toward the valve 2, induced by magnetic force, is transmitted directly to the tappet rod 25, whereby the rod moves with it and causes the first seat valve 23 to open and the second seat valve 24 to close. In essence, with increasing displacement of the armature 14 and tappet rod 25, a spring force of the spring element 15 aligned with the valve 2 and a fluid pressure force acting on the closing element 231 in this case produce an increasing force in opposition to the magnetic force, whereby the first seat valve 23 opens and the second seat valve 24 closes only far enough for a force equilibrium to be established between the magnetic force and the opposing force. During this, depending on the opening width of the seat valves 23, 24 a definite fluid pressure is produced in the first outlet area A, which is lower than the fluid pressure in the inlet area P but higher than the fluid pressure in the second outlet area T. As a rule the fluid pressure in the second outlet area T corresponds to atmospheric pressure since the outlet area T is normally connected to a fluid reservoir under atmospheric pressure. Since the magnetic force acting on the armature 14 depends on the size of the electric current supplied to the solenoid 12 and the opposing force depends on the displacement of the armature 14, a pressure level in the outlet area A can be set or adjusted very precisely by virtue of the electric current supplied.

It should be noted here that the locations or shift positions of the armature 14, the tappet rod 25 and the seat valves 23, 24 shown in FIG. 1 correspond to locations/shift positions in an initial position of the pressure control valve unit in which the magnetic solenoid 12 is not energized, so that no magnetic force is acting on the armature 14. Since the first seat valve 23 is thus fully closed and the second seat valve 24 is fully open so that no fluid can flow through the pressure control valve unit from the inlet side P (the pressure at the first outlet side is therefore at "0"), the pressure control valve unit illustrated is a "normally closed" pressure control valve unit with a rising valve characteristic. In other words, as the current supplied increases the first seat valve 23 opens and the second seat valve 24 closes, whereby the pressure that can be tapped off from the first outlet area A increases.

The pressure control valve unit shown can also be redesigned such that it is a "normally open" pressure control valve unit with a falling valve characteristic. In that case, in the non-energized initial condition of the pressure control valve unit the first seat valve 23 is fully open and the second seat valve 24 is fully closed, so that fluid from the inlet area P can flow exclusively to the first outlet area A and the pressure in the latter is a maximum. As the current supplied to the solenoid 12 increases the first seat valve 23 is closed and the second seat valve 24 opened, so that the pressure available from the first outlet area A falls correspondingly. For this purpose the first and second seat valves 23, 24 are reconfigured in such manner that the closing element 231 is downstream from the valve aperture 234 and the closing element 241 is upstream from the valve aperture 244, whereas the magnet yoke 13 with its recess 131 and the control edge 132 are arranged on the side of the electromagnet portion 1 that faces away from the valve portion 2.

As shown in FIG. 1, on the inlet side, i.e. upstream from the first seat valve 23 a first flow-guiding device 26 is arranged in the inlet area P, which imposes a specific flow characteristic on the inflowing fluid in the area of the first seat valve 23. In this way, in particular both the flow resistance of the closing element 231 of the first seat valve 23 can be reduced, and also the pressure control valve unit can be made less sensitive to excitations or disturbances in the fluid flow, such as pressure fluctuations. Owing to the imposition of a specific flow characteristic, the pressure control valve unit can also be used regardless of differing fluid systems since the fluid flowing in is then guided along specific paths before any contact with the seat valves 23. 24 independently of the fluid system concerned, i.e. it conforms to the specific flow characteristic. Accordingly, the pressure control valve unit can be used with different fluid systems more simply and without adaptation.

In the case illustrated the flow-guiding device 26 consists of a plurality of flow-guiding channels 261 formed as recesses in the housing 21 of the valve portion 2 along the longitudinal axis L of the pressure control valve unit. In a section plane S perpendicular to the longitudinal axis L each of the flow-guiding channels 261 has a cross-section shaped like a propeller blade (see FIGS. 2 and 3d). Thus, with increasing proximity to the longitudinal axis L the width and therefore the flow cross-section of each flow-guiding channel 261 decreases, so that with increasing proximity to the longitudinal axis L the fluid accelerates as it flows through the flow-guiding channel 261. This is reinforced by the fact that in the downstream direction toward the seat valve aperture the flow-guiding channels 261 converge in a funnel shape (see FIG. 2). In this case the funnel shape is formed by end areas of the flow-guiding channels 261 which, approaching the longitudinal axis L in the axial direction, are inclined relative to the longitudinal axis L so as to converge toward it.

At the center of the flow-guiding device 26, here for example coaxially with the longitudinal axis L, there is in the inlet area P an opening 262, in particular circular, for example a bore, within which the closing element 231 of the first seat valve 23 is arranged and can move and into which the flow-guiding channels 261 open. In the upstream direction the opening 262 is closed by a plug 222 which prevents the closing element 231 from falling out of the pressure control valve unit. In the example embodiment shown the plug 222 is part of the filter strainer 22 but it can also be made as a separate component or as part of the flow-guiding device 26 or of the housing 21. Not shown, is the fact that the plug 222 is preferably designed so as to assist flow, in particular with a drop-shaped or pointed cone-shaped form. Thus, the plug 222 preferably forms part of the flow-guiding device 26. This can also happen if the plug 222 too has flow-guiding channels, guide vanes or the like. Moreover, the plug 222 and the housing 21 can be designed such that the flow-guiding device 26 is only formed when the components are assembled together, i.e. the two components 21 and 222 constitute complementary parts of the flow-guiding device 26 which only form the actual flow-guiding device 26 when they are fitted together.

In an embodiment of the pressure control valve unit which is also not illustrated, the flow-guiding device 26 is formed as a sleeve which is in particular fitted into the housing 21, for example pressed in or bonded, during the assembly of the pressure control valve unit. The sleeve can even comprise parts of the first seat valve 23, in particular its valve orifice plate 232, or it can incorporate the whole of the first seat valve 23.

The flow-guiding channels 261 open at least approximately tangentially onto the opening 262 or valve aperture of the first seat valve 23 in the inlet area P, i.e. the outlet openings of the flow-guiding channels 261 open into the opening 262 with a lateral offset relative to the longitudinal axis L. In this way the fluid flowing into the opening 262 and into the valve aperture 234 is set into a twisting motion about the longitudinal axis L, which results in a particularly advantageous direction and stabilization of the flow. To be specific, the fluid flowing into the pressure control valve unit flows onto the closing element 231 tangentially in a thin film along the surface of the closing element 231, with low flow resistance. This transmits pressure fluctuations or other disturbances/excitations to the closing element 231 either not at all, or only to a very small extent. Furthermore, the spiral flow stabilizes the position of the closing element 231 on the rotational axis of the stream, i.e. in the case shown on the longitudinal axis L. Thus, even if acted upon by external forces such as mechanical vibrations of the housings 11 and 12, the closing element 231 is held in the spiral flow in a stable position.

Preferably but not necessarily, the flow-guiding devices 26, 28 are designed as shown, such that the spiral flows produced by each rotate in the same sense.

After flowing through the first seat valve 23 the fluid passes into an intermediate space 27 wherein the fluid flow divides into a first part-stream to the first outlet area A and a second part-stream to the second seat valve 24. The quantity ratio of the first and second part-streams is determined by the opening width of the second seat valve 24, to be specific by the effective valve aperture area of the second seat valve 24. The first outlet area A has lateral openings in the housing 21 of the valve portion 2 to let out the first part-stream. Analogously, the second outlet area has lateral openings in the housing 21 to let out the second part-stream.

Optionally, as shown in FIG. 1 a second flow-guiding device 28 is arranged in the intermediate space 27 upstream from the first seat valve 23, fluidically between the first and second outlet areas A. T. This is designed such that the fluid flowing to the second outlet area T, i.e. the second part-stream has imparted to it a twisting motion about the longitudinal or movement axis of the first seat valve 23, here the longitudinal axis L of the pressure control valve unit. The second flow-guiding device 28 consists essentially of a spiral flow producer with a plurality of flow-guiding channels 281 and the valve orifice plate 241 of the second seat valve 24. In this case the flow-guiding channels 281 extend in a helix concentric to the longitudinal axis L. Starting from an outlet of the flow-guiding channels 281 the valve orifice plate 242 extends to the valve aperture 244 of the second seat valve 24 in the shape of a nozzle, whereby the speed of the spiral flow in the downstream direction increases with increasing proximity to the valve aperture 244 (conservation of angular momentum). After passing through the second seat valve 24 the fluid arrives in the second outlet area T. This is often associated with a fluid reservoir under atmospheric ambient pressure. Designing the pressure control valve unit with a second flow-guiding device 28 can improve the dynamics of the pressure control valve unit while at the same time reducing the leakage.

Basically, the second flow-guiding device 28 shown in FIG. 1 can be designed differently and can for example have guide vanes or the like for producing the spiral flow. Or else the second flow-guiding device 28 can be omitted, particularly if higher leakage or lower valve dynamics are acceptable or desired. However, the second flow-guiding device 28 can also be made analogously to one of the embodiments of the first flow-guiding device 26 described herein. Thus for example, the first and second flow-guiding devices 26, 28 can also be made identically.

In the example embodiment illustrated the second flow-guiding device 28 is made integrally, but of course the twist-producing element and the valve orifice plate 242 can also form a multi-part component. Alternatively, the twist-producing element and/or the valve orifice plate 242 form an integral component with the housing 21. Moreover, to actuate the tappet rod 25, i.e. to move it linearly, instead of the electromagnet portion 1 some other suitable actuator system can be provided, for example a hydraulic, pneumatic or other type of electric actuator that acts in a linear direction.

Figure 2:
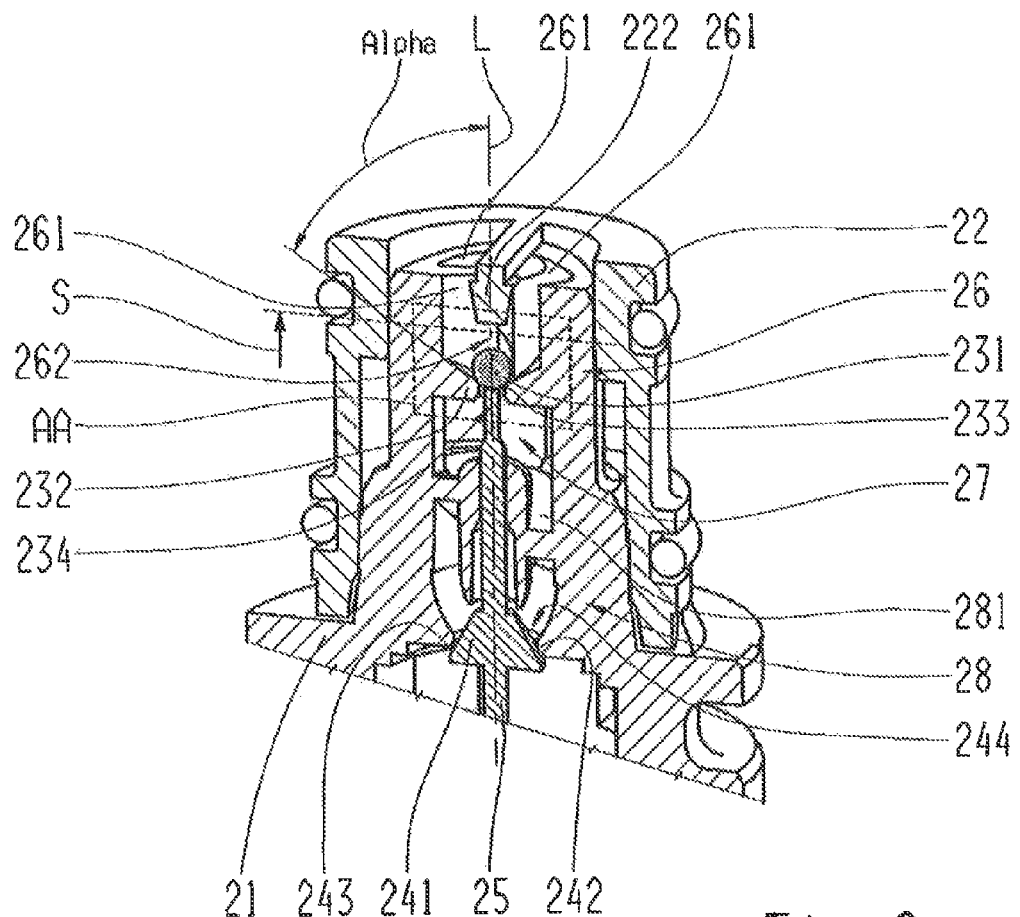
FIG. 2: An isometric section through a valve portion of a pressure control valve unit according to FIG. 1, along a longitudinal axis of the pressure control valve unit.

FIG. 2 shows an enlarged isometric view of the valve portion 2 of the pressure control valve unit in FIG. 1. In this case the electromagnet portion 1 is not shown. As can be seen in FIG. 2, the valve control edge 233 has an obtuse angle. Downstream from the valve control edge 233 the valve aperture 234 is at first cylindrical. However, after this cylindrical shape it widens out toward the intermediate space 27 in the manner of a diffuser. The flow-guiding channels 261 are in the form of recesses in the housing 21 that extend straight along the longitudinal axis L, their cross-section in a section plane S perpendicular to the longitudinal direction L being propeller-shaped. Other suitable cross-section shapes are conceivable. In particular, instead of extending straight along the longitudinal axis L they can also extend helically around the longitudinal axis L, like or similarly to the flow-guiding channels 281 of the second flow-guiding device 28.

In the example embodiment shown the flow-guiding channels 261 converge in a funnel shape in the downstream direction toward the valve aperture. For this, end areas, in this case straight end faces of the flow-guiding channels 261, are inclined relative to the longitudinal axis L. The opening angle ALPHA of the funnel shape is about 60° in the case shown, but preferably the opening angle is around 60°±10°. The funnel shape, i.e. in this case the end areas of the flow-guiding channels, can also be rounded and thus convex or concave. The opening angle then corresponds to an average inclination angle of the funnel shape relative to the longitudinal axis L.

Figure 2A:
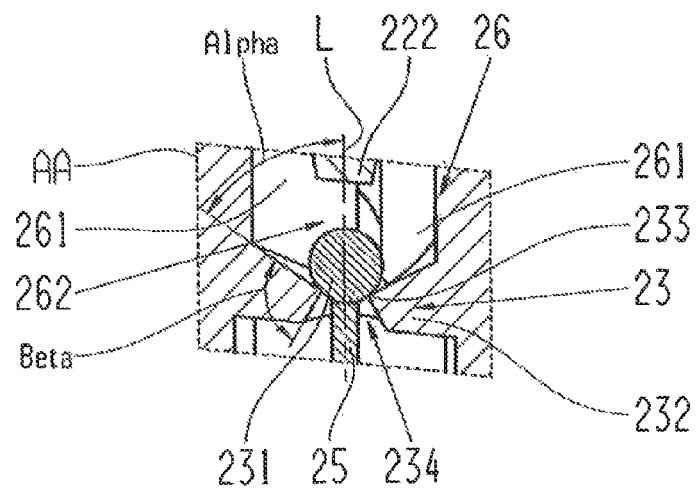
FIG. 2a: An enlarged view of part of FIG. 2, with an alternative design for a valve aperture of the first seat valve.

FIG. 2a shows an enlarged view of the portion AA in FIG. 2, but with an alternatively designed valve control edge 233 and valve aperture 234. Compared with the version in FIGS. 1 and 2 the valve control edge 233 of the first seat valve 23 is in this case a right-angle (angle BETA) with no, or a negligibly small chamfer, i.e. the valve control edge is "sharp". This results in an advantageously low flow resistance as the fluid passes through the first seat valve 23. The valve aperture 234 of the first seat valve 23 widens out continuously downstream from the valve control edge 233 in the manner of a diffuser. The diffuser action so produced results in damping of pressure fluctuations induced upstream or downstream from the inlet area P and reduces a pressure drop in the immediate vicinity of the closing element 231, which assists a closing or opening movement of the closing element 231 and thus improves the valve dynamics. Instead of straight surfaces, downstream from the valve control edge 233 the valve aperture 234 can also have curved surfaces, i.e. these can be convex or concave. Likewise, instead of right-angled the valve control edge 233 can also be acute-angled.

FIGS. 3a to 3e show examples of alternatively designed cross-sections of the cross-sections of the flow-guiding channels 261 in FIGS. 1 and 2 along the section plane S.

Figure 3A:
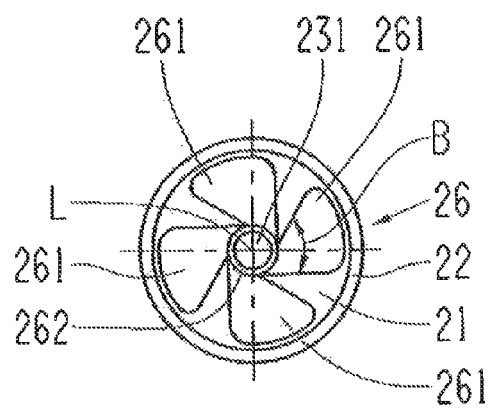
FIGS. 3a-3e: Cross-sections of alternative flow-guiding devices along a section plane perpendicular to the longitudinal axis of the pressure control valve unit.

In FIG. 3a the flow-guiding device 26 has four flow-guiding channels 261 forming a propeller-shape. The width or flow cross-section B of the flow-guiding channels 261 decreases with increasing proximity to a longitudinal axis L of the pressure control valve unit, in particular a longitudinal or movement axis of the first seat valve. The flow-guiding channels 261 each open with an outlet opening into the common opening 262, which in this case extends coaxially along the longitudinal axis L, within which the closing element 231 of the first seat valve is located and can move. To produce a spiral flow, in the case illustrated a flow with a clockwise rotation direction, the outlet openings are laterally offset relative to the longitudinal axis L in such manner that they face tangentially past the longitudinal axis L. The fluid emerging from the flow-guiding channels 261 therefore flows tangentially or at least approximately so relative to the valve aperture of the first seat valve into the opening 262, preferably in the form of a thin film along the closing element 231. In other words, at the root of each propeller blade shaped flow-guiding channel 261 there is a fluid outlet opening into a common opening 262 of the flow-guiding device 26, which merges downstream into the valve aperture of the first seat valve, the opening location of the outlet opening into the opening 262 being chosen such that a spiral flow is produced downstream from the flow-guiding channels 261 in the area of the first seat valve.

Figure 3B:
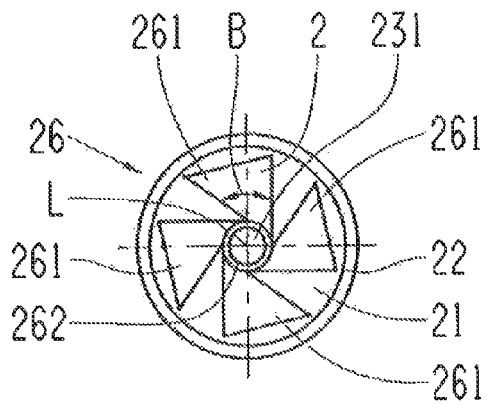

In contrast to the flow-guiding device 26 in FIG. 3a, the flow-guiding device 26 of FIG. 3b has propeller-shaped flow-guiding channels 261 with an essentially triangular cross-section. The corners of the triangular shape can of course be rounded, i.e. provided with an inside radius.

Figure 3C:
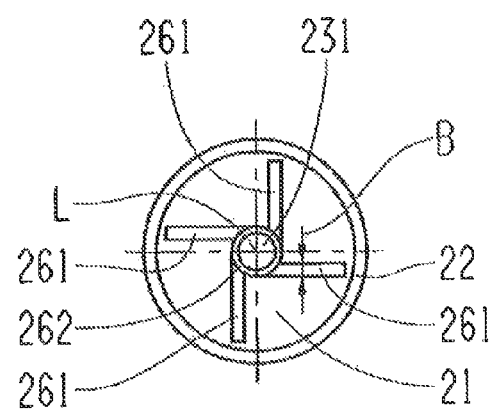

The flow-guiding device 26 in FIG. 3c differs from that shown in FIG. 3a in that its flow-guiding channels 261 have tetragonal, here in particular rectangular cross-sections. The width B of the flow-guiding channels 261 is therefore constant. In this case too the corners of the tetragon can be rounded.

Figure 3D:
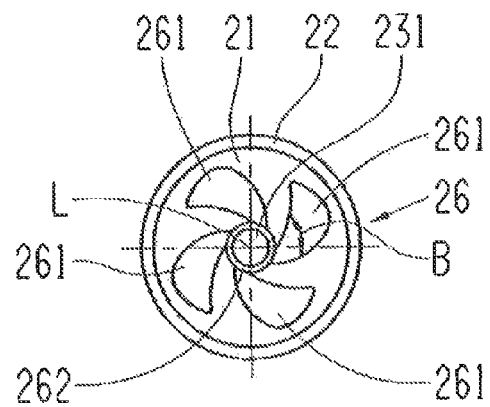

The flow-guiding device 26 in FIG. 3d corresponds essentially to the flow-guiding device 26 in FIG. 3a, except that compared with those in FIG. 3a the flow-guiding channels 261 are more markedly twisted. In other words an inner area of the flow-guiding channels 261, relative to the outer area thereof, is offset in the direction of the spiral rotation of the fluid flow relative to the longitudinal axis L, whereby the spiral flow producing effect of the flow-guiding device 26 is enhanced. Owing to this configuration the flow-guiding channels 261 extend in a spiral shape into the opening 262 or the valve aperture of the first seat valve. This design in the one illustrated in FIG. 2.

Figure 3E:
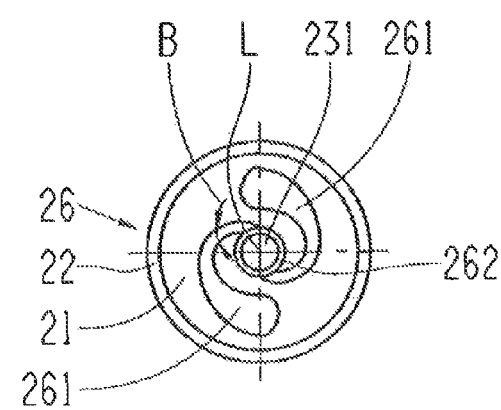

The flow-guiding device 26 in FIG. 3e has a more marked spiral twist of the flow-guiding channels 261 compared with FIG. 3d, and in addition only two flow-guiding channels 261 are provided.

As shown in FIGS. 1 and 2, the flow-guiding channels 261, in particular those shown in FIGS. 3a to 3e, can be in the form of recesses extending along the longitudinal axis L, i.e. with sidewalls directed essentially parallel to the longitudinal axis L. Alternatively, the flow-guiding channels 261 can also be shaped helically and in particular they can spiral coaxially around the longitudinal axis L. Instead of two or four flow-guiding channels 261, in each case three, five, six etc. channels 261 can also be provided. A flow-guiding device 26 with only one flow-guiding channel 261 is also possible. A uniform distribution of the flow-guiding channels 261 around the longitudinal axis L, i.e. equal separations between the flow-guiding channels, is preferred but not essential. In particular, the shape and positions of the flow-guiding channels 261 are symmetrical with respect to one another.

As shown in the figures, the flow-guiding channels 261 can have elongated outlet openings which open into the opening 262 along the full axial length of the flow-guiding device 26. However, it can also be expedient for the flow-guiding channels 261 to open into the opening 262 only in certain areas in order to produce a particularly suitable fluid flow. For example, the flow-guiding channels 261 can even open into the opening 262 only in a downstream, end area of the flow-guiding device 26, in particular in the immediate vicinity of the valve aperture of the first seat valve, in order to achieve a particularly good spiral-producing effect.

Figure 4:
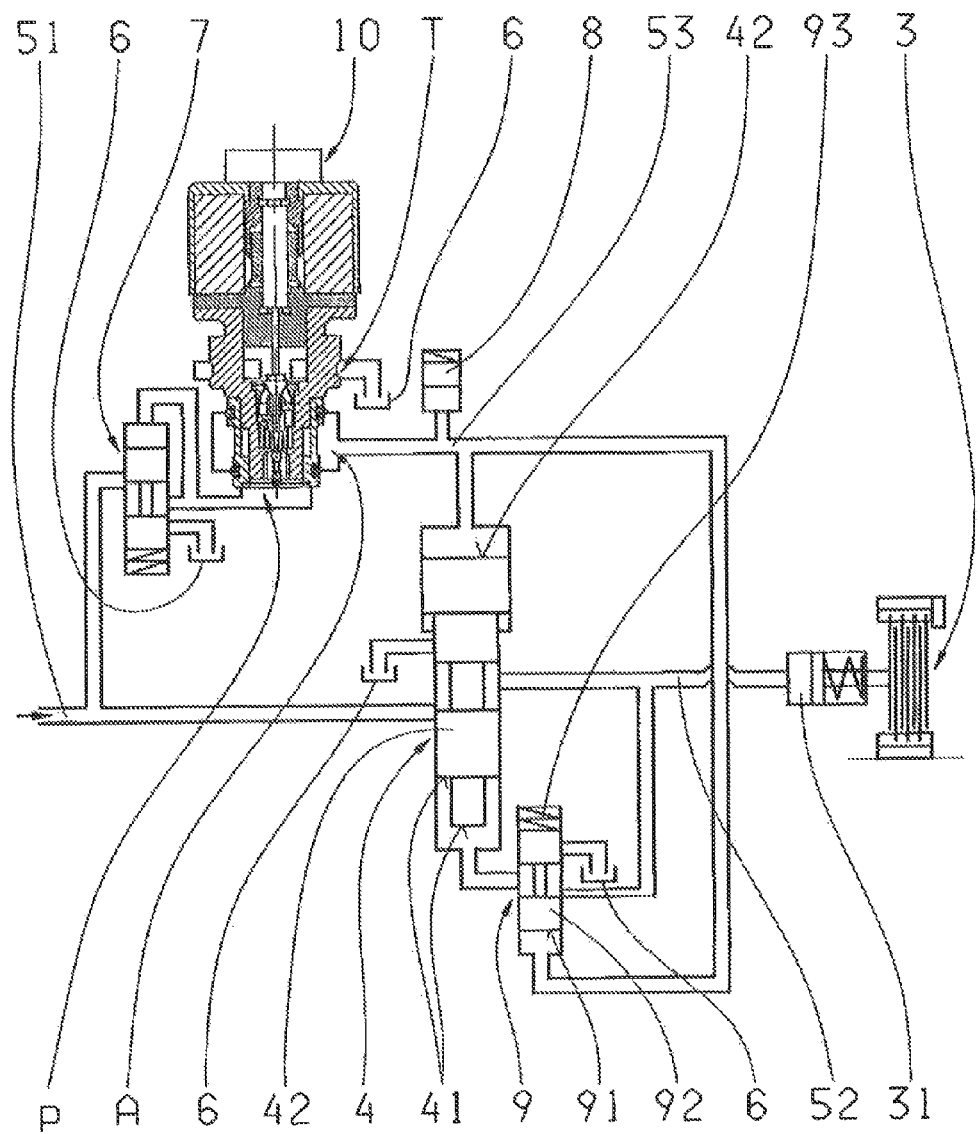
FIG. 4: A hydraulic fluid system for actuating a transmission shifting element of a vehicle.

FIG. 4 shows a hydraulic fluid system for actuating a transmission shifting element 3 of a vehicle, for example a one-stage or multi-stage vehicle transmission. The pressure control valve unit shown in FIG. 1 and indexed 10 in FIG. 4 serves for the hydraulic pilot control of a shifting element valve 4 that supplies the transmission shifting element 3 with a hydraulic shifting pressure. In FIG. 4, therefore, the pressure control valve unit is designed as a hydraulic pressure control valve unit. However, the pressure control valve unit can also be used to regulate the pressure of other fluids, in particular liquids such as water or brake fluid. FIG. 4 serves only to illustrate a preferred application of the proposed pressure control valve unit, but other possible applications are also conceivable. Thus, FIG. 4 is not to be understood as restrictive.

The hydraulic fluid system comprises an inlet line 51 through which it is supplied with hydraulic fluid under a main system pressure. For this, upstream from the inlet line 51 there is a hydraulic pump (not shown), which draws the hydraulic fluid from a fluid reservoir 6. The inlet line 51 divides into a first branch leading directly to the shifting element valve 4 and a second branch for the pilot control of the shifting element valve 4, which leads to the pressure control valve unit 10 via a pressure-reduction valve 7.

From the shifting element valve 4 a shifting element line 52 leads on the one hand to a simply acting cylinder 31 of the shifting element 3, which actuates the shifting element 3, in this case in the form of a disk brake, in the closing or opening direction by extending or retracting a piston rod, and on the other hand the shifting element line 52, acting in the manner of a control line, leads via a holding valve 9 to a first axial control face 41 of a valve slide 42 of the shifting element valve 4.

The pressure-reduction valve 7 in the second branch of the inlet line 51 lowers the main system pressure in a known manner to a pilot pressure, which is passed into the inlet area P of the pressure control valve unit 10. Any waste fluid is returned to the reservoir 6 for re-use.

As described earlier the pressure control valve unit 10 regulates the pilot pressure, as a function of the size of the electric current supplied, to lower than a pilot control pressure which is tapped via a pilot control line 53 from the first outlet area A of the pressure control valve unit 10. During this, any fluid (leakage fluid) going to waste is returned to the reservoir 6 by way of the second outlet area T of the pressure control valve unit 10.

In the pilot control line 53 is arranged a spring-type pressure damper 8, which reduces pressure fluctuations in the line 53 and displaces a resonance frequency of the fluid system to uncritical frequency ranges. Any residual pressure fluctuations in the inlet or first outlet areas A, P of the pressure control valve unit 10 are further attenuated or completely eliminated by the proposed first flow-guiding device of the pressure control valve unit 10. Due to this the size of the pressure damper 8 can be reduced, or it can be dispensed with completely.

In the downstream direction, the pilot control line 53 branches on the one hand into a line section leading to a second axial control face 43 of the valve slide 42 of the shifting element valve 4, and on the other hand into a line section which opens onto an axial control face 91 of a valve slide 92 of the holding valve 9. Opposite the control face 91 the holding valve 9 has an elastic element 93, in this case a compression spring, which with increasing displacement of the valve slide 92 produces an increasing force in opposition to the force of the pilot pressure applied on the control face 91.

Thus, the pressure exerted on the first control face 41 of the shifting element valve 4 can be adjusted directly by the pilot pressure, whereas the pressure exerted on the second control face 43 can be adjusted by the pilot pressure indirectly, via the holding valve 9.

The second control face 43 of the shifting element valve 4 is arranged on the valve slide 42 diametrically opposite the first control face 41 and has a larger axial area than the first control face 41. Accordingly, the valve slide 42 is acted upon by a resultant force between the control faces 41, 43, whereby the shifting pressure present in the shifting element line 52, which is used for actuating the shifting element 3, can be adjusted as a function of the pilot pressure.

Alternatively, the fluid system for actuating the shifting element 3 can also be designed as a fluid system with direct control instead of pilot control, and in that case the shifting element valve 4 is made in the same way as the pressure control valve unit 10. The elements 7, 9, 10 and 53 required for pilot control can then be omitted. However, the electric currents required for actuating the shifting element valve 4 are then larger than in the fluid system with pilot control illustrated, so the electromagnet portion 1 of the shifting element valve 4 then has to be made larger.

Of course, the transmission shifting element 3 can be of any other type, for example a multi-disk clutch, claw clutch or claw brake, if necessary also provided with synchronization means, or else as a single-disk clutch or brake. Preferably, the shifting element 3 serves for engaging various gear ratio steps in a multi-stage vehicle transmission or for coupling or decoupling vehicle transmission shafts, for example coupling or decoupling a transmission input shaft, a vehicle all-wheel shaft or a vehicle axle shaft.

INDEXES

1 Electromagnet portion
10 Pressure control valve unit
11 Housing
12 Magnetic solenoid
13 Magnet yoke
131 Recess
132 Magnet control edge
14 Armature
141 Armature rod
142 Armature body
143 Anti-sticking disk
15 Spring element
16 Pre-stressing element
17 Contacting device
18 Bearing
19 Pole tube
2 Valve portion
21 Housing
22 Filter strainer
221 Filter
222 Plug
23, 24 Seat valve
231, 241 Closing element
232, 242 Valve orifice plate
233, 243 Valve control edge/valve control surface
234, 244 Valve aperture
25 Tappet rod
26, 28 Flow-guiding device
261, 281 Flow-guiding channel
262 Opening
27 Intermediate space
3 Shifting element
31 Cylinder
4 Shifting element valve
42 Valve slide
41, 43 Control surface
51 Supply line
52 Shifting element line
53 Pilot control line
6 Reservoir
7 Pressure reduction valve
8 Pressure damper
9 Holding valve
91 Control surface
92 Valve slide
93 Elastic element
A, T Outlet area
AA Section
B Width of a flow-guiding channel 261
P Inlet area
S Section plane
ALPHA Opening angle
BETA Angle of valve control edge

The invention claimed is:

1. A pressure control valve unit (10) for a fluid, with at least one inlet area (P) and first and second outlet areas (A, T), which are fluidically connectable with one another by two mutually coupled seat valves (23, 24),
an incoming fluid flow from the inlet area (P) to the first and the second outlet areas (A, T) is adjustable via the first seat valve (23),
a fluid outflow, between the first and the second outlet areas (A, T), is adjustable via the second seat valve (24),
a flow-guiding device (26) being arranged in the inlet area (P), the flow-guiding device (26) defining a plurality of channels located upstream of a seal formed by a closing element (231) with the first seat valve (23), and the flow-guiding device (26) imposing a specific flow characteristic upon inflowing fluid in an area of the first seat valve (23);
the flow-guiding device (26) is designed such that a spiral, twisting motion is imparted to the inflowing fluid in the area of the first seat valve (23); and
second flow-guiding device (28) is arranged upstream of the second seat valve (24), fluidically between the first and the second outlet areas (A, T), and is designed such that a spiral, twisting motion is imparted to the fluid flowing to the second outlet area (T) in an area of the second seat valve (24).

2. The pressure control valve unit (10) according to claim 1, wherein the flow-guiding device (26) is designed such that the fluid arriving at the first seat valve (23) flows along the closing element (231) of the first seat valve (23) substantially in the form of a thin film.

3. The pressure control valve unit (10) according to claim 1, wherein the first and the second flow-guiding devices (26, 28) are designed such that the spiral fluid flows, through the first (23) and the second (24) seat valves, have a same rotational direction.

4. The pressure control valve unit (10) according to claim 1, wherein the flow-guiding device (26) has at least one flow-guiding channel (261) which opens at least approximately tangentially onto a valve aperture (234) of the first seat valve (23) in the inlet area (P).

5. The pressure control valve unit (10) according to claim 1, wherein a valve control edge (233) of the first seat valve (23) is at least approximately either acute-angled or right-angled (BETA).

6. The pressure control valve unit (10) according to claim 1, wherein a valve aperture (234), of the first seat valve (23), widens out continuously downstream of either a valve control edge (233) or a control surface of the first seat valve (23).

7. The pressure control valve unit (10) according to claim 1, further comprises an electromagnet (12, 13, 14) for actuating closing elements (231 241) of the first and the second seat valves (23, 24).

8. The pressure control valve unit (10) according to claim 1 wherein the pressure control valve unit (10) is integrated in a vehicle transmission along a hydraulic line.

9. The pressure control valve unit (10) according to claim 4, wherein the at least one flow-guiding channel (261) extends, in a downstream direction, as a funnel shape toward the valve aperture (234) of the first seat valve (23).

10. The pressure control valve unit (10) according to claim 9, wherein the funnel shape has an opening angle (ALPHA) of between 40° to 80°.

11. The pressure control valve unit (10) according to claim 4, wherein a width (B) of the at least one flow-guiding channel (261) decreases with increasing proximity to a longitudinal axis (L) of the pressure control valve unit.

12. The pressure control valve unit (10) according to claim 11, wherein a cross-section of the flow-guiding channel (261), along a plane perpendicular to a longitudinal axis (L) of the pressure control valve unit, is propeller-shaped.

13. The pressure control valve unit (10) according to claim 7, wherein the electromagnet (12, 13, 14) comprises a proportional electromagnet.

14. A pressure control valve unit (10) for a fluid, the pressure control valve unit comprising:
 a first seat valve arranged in a direction of fluid flow between an inlet area and a first outlet area of the pressure control valve unit,
 an incoming fluid flow from the inlet area to the first outlet area and a second outlet area being adjustable via the first seat valve;
 a second seat valve being arranged in a direction of fluid flow between the first outlet area and the second outlet area of the pressure control valve unit,
 the first and the second seat valves being mutually coupled,
 a fluid outflow between the first outlet area and the second outlet area being adjustable via the second seat valve;
 a first flow-guiding device being arranged in the inlet area of the pressure control valve unit, upstream of the first seat valve, and the first flow-guiding device imposing a spiral, twisting motion upon the incoming fluid flow in an area of the first seat valve;
 a second flow-guiding device being arranged upstream of the second seat valve, in the direction of fluid flow between the first outlet area and the second outlet area, and the second flow-guiding device imposes a spiral, twisting motion upon the fluid flowing to the second outlet area in an area of the second seat valve; and
 the first and the second flow-guiding devices being designed such that the spiral, twisting motion of fluid, flowing through the first and the second seat valves, flows in a common rotational direction.

15. A pressure control valve unit (10) for a fluid, with at least one inlet area (P) and first and second outlet areas (A, T), which are fluidically connectable with one another by two mutually coupled seat valves (23, 24),
 an incoming fluid flow from the inlet area (P) to the first and the second outlet areas (A, T) is adjustable via the first seat valve (23),
 a fluid outflow, between the first and the second outlet areas (A, T), is adjustable via the second seat valve (24),
 a flow-guiding device (26) being arranged in the inlet area (P), upstream of the first seat valve (23), and the flow-guiding device (26) imposing a specific flow characteristic upon inflowing fluid in an area of the first seat valve (23);
 the flow-guiding device (26) is designed such that a spiral, twisting motion is imparted to the inflowing fluid in the area of the first seat valve (23),
 a second flow-guiding device (28) is arranged upstream of the second seat valve (24), fluidically between the first and the second outlet areas (A, T), and is designed such that a spiral, Misting motion is imparted to the fluid flowing to the second outlet area (T) in an area of the second seat valve (24), and
 the first and the second flow-guiding devices (26, 28) are designed such that the spiral fluid flows, through the first (23) and the second (24) seat valves, have the same rotational direction.

* * * * *